US006453617B1

(12) United States Patent
Klippert et al.

(10) Patent No.: US 6,453,617 B1
(45) Date of Patent: Sep. 24, 2002

(54) ADJUSTABLE CARRIER FOR CONNECTING A WINDOW PANE TO A MOTOR VEHICLE WINDOW LIFT

(75) Inventors: Uwe Klippert, Oberaula; Adrian Geiger, Coburg; Armin Stahn, Kups; Georg Scheck, Weitramsdorf; Maik Kindler, Gleussen/Itzgrund; Jochen Hölzel, Coburg, all of (DE)

(73) Assignee: Brose Fahrzeugteile GmbH & Co. KG, Coburg, Coburg (DE)

(*) Notice: Subject to any disclaimer, the term of this patent is extended or adjusted under 35 U.S.C. 154(b) by 0 days.

(21) Appl. No.: 09/674,865

(22) PCT Filed: Apr. 30, 1999

(86) PCT No.: PCT/DE99/01362

§ 371 (c)(1),
(2), (4) Date: Jan. 8, 2001

(87) PCT Pub. No.: WO99/57400

PCT Pub. Date: Nov. 11, 1999

(30) Foreign Application Priority Data

May 5, 1998 (DE) ........................................ 198 19 953

(51) Int. Cl.[7] ................................................ B60J 1/16
(52) U.S. Cl. ........................................................ 49/375
(58) Field of Search .......................... 49/374, 375, 348, 49/349, 350, 351, 352

(56) References Cited

U.S. PATENT DOCUMENTS 4,730,414 A 3/1988 Nakamura et al. ............ 49/348
5,546,704 A * 8/1996 Maruoka ..................... 49/375
5,966,872 A * 10/1999 Wasek et al. ................. 49/375
5,987,820 A * 11/1999 Shibanushi .................. 49/375
6,041,549 A * 3/2000 Schust et al. ................. 49/375
6,119,403 A * 9/2000 Klippert et al. ............... 49/375
6,125,588 A * 10/2000 Schultz ........................ 49/375
6,205,711 B1 * 3/2001 Klippert ...................... 49/375

FOREIGN PATENT DOCUMENTS

| | | |
|---|---|---|
| DE | 28 43 634 | 4/1980 |
| DE | 32 43 123 | 5/1984 |
| DE | 35 45 856 | 1/1987 |
| DE | 37 04 816 | 7/1989 |
| DE | G 93 07 599.5 | 9/1993 |
| DE | 44 35 008 | 4/1996 |

* cited by examiner

*Primary Examiner*—Jerry Redman
(74) *Attorney, Agent, or Firm*—Christie, Parker & Hale, LLP

(57) ABSTRACT

An adjustable carrier for connecting a window pane to a window lift of a motor vehicle door, whereby the carrier is assigned to the motor vehicle door via guiding tracks. The carrier includes a base body and a holding body. The base body is guided on the guiding tracks of the window lift, and the window pane is clamped in the holding body. The holding body can horizontally sweep in relation to the base body, and a joint connection is provided between the base body and the holding body. An adjusting element which can be operated by a tool are provided for changing the position of the holding body provided for changing the position of the holding body relative to the base body. This position is directly or indirectly changed by an actuator in such a way that the position of the holding body relative to the base body remains unchanged when loosening or fastening the window pane.

28 Claims, 15 Drawing Sheets

2.3
28.2
26.1
25.1
24.1
36.2
35.2
33.3
1.3
28.1
27
29
55
54.1
54.2
15
16

2.6
42
43
43.1
43.2
4.2
44.1
44.2
1.6
28.4
R'
R

7

A
M
25.4
R1
26.4
4.4'
1.8
R2
2.8
28.5
4.4"

ADJUSTABLE CARRIER FOR CONNECTING A WINDOW PANE TO A MOTOR VEHICLE WINDOW LIFT

The invention relates to an adjustable carrier for connecting a window pane to a window lift of a motor vehicle.

The carrier is associated with the vehicle door through at least one guide track and consists basically of a base body and a holding body wherein the base body is guided on the guide track of the window lift and the window pane is clamped on the holding body. The holding body is able to swivel relative to the base body by means of a movable displacement means, and an articulated joint connection is provided between the base body and the holding body.

BACKGROUND OF THE INVENTION

From DE 44 35 008 A1 a solution is known for adjusting the window pane during the course of assembly. The preferably frameless window pane is held inside the door by guide tracks. The guide tracks are able to swivel in the transverse direction of the vehicle about a rotary axis which lies in the upper fixing point of the guide tracks. Adjustment is made by an adjusting device at the bottom end of the guide track.

The drawback with this solution is that the space in the lower region of the door is restricted, as a condition of the distance between the turning point and site of the adjusting device so that no great adjusting paths can be produced. Furthermore the entire installation area is affected, that is the adjusting path has to be taken into account when designing the whole door.

These drawbacks are overcome in DE-OS 28 43 634. The rotary axis of the swivel movement is here in the carrier. The carrier has a ball segment which corresponds with a corresponding bearing shell. A tension screw is mounted centrally in the bearing shell and in the ball segment and engages into the hole in the pane to interact with a tension plate. The adjustment and swivel movement is produced by swivelling the bearing shell. The position is fixed by tensioning with the tension screw.

Adjusting the window pane thus takes place freely within the area. That is, it is necessary to proceed stepwise by the trial and error method in order to reach the correct position. If the ideal position is not reached with the current adjustment step then the pane clamp has to be released. Thus the previous position becomes lost and the next adjustment step has to be introduced. As a condition of this setting principle an undesired vertical displacement takes place when adjusting the pane across the driving direction.

With another solution known from DE 93 07 599 U1 the window pane is fixed on a separate part connected for articulated movement to the base body of the carrier. Between this part and the carrier there is a vertically displaceable wedge so that it is possible to change the angular position of this part relative to the carrier and thus the position of the window pane relative to the vehicle body. The drawback here is that when the connection between the base body and holding body of the carrier becomes loose the connection between the holding body and window pane is also released at the same time.

From DE 35 45 856 C1 a carrier is known for a motor vehicle window lift which has a base plate guided between two guide rails and a holding rail connected to same through a ball joint for the purpose of holding a window pane. Adjusting the position of the holding rail relative to the base plate is carried out directly by means of a threaded bolt on the base plate which engages in a threaded bush of the holding rail.

SUMMARY OF THE INVENTION

The object of the invention is to provide a simple solution for swivelling the window pane about an axis lying substantially parallel to the driving direction and through which it becomes possible to position the window pane with precision against an associated sealing contour on the vehicle body.

According to one variation of the solution, the base body and the holding body of the carrier are connected together by an articulated joint and adjusting means for changing the position of the holding body relative to the base body are provided on the carrier and can be operated by means of a tool from outside of the carrier and window lift (by an operator or robot for example). These adjusting means act independently of the fastening means by which the window pane is fixed on the holding body of the carrier. The relative position of the holding body and base body can therefore be changed directly or indirectly by operating the adjusting means so that even when the fixing of the window pane is loosened later on this position remains set.

A displacement means in the form of a displaceable element (such as for example a sliding wedge) is thereby associated with the adjusting means and can be moved by the adjusting means in the direction of the articulated connection between the holding body and base body so that an indirect connection is provided here. In order to form contact faces between the displaceable element with the base body and/or the holding body a circular arc shaped curved cylinder surface with the same radius and same center point is provided both on the displaceable element and on the holding body or base body so that a complete surface contact is achieved during the course of displacement. This has the advantage of making displacement simple and uncomplicated.

Displacement is carried out by operating the adjusting means from outside, preferably through the crash guard strip of the vehicle body. As adjusting means are adjusting screws, threaded spindles, threaded bolts or the like.

A turning angle on the adjusting means is assigned to a precisely fixed displacement path on the top edge of the window pane so that adjustment can take rapidly and with precision.

In another basic variation of the solution the displaceable part consists of two segments of which each segment has a contact zone which is connected to an associated contact area on the base body and/or on the holding body and wherein the tangents at the contact faces, contact lines and/or contact points have different slopes. The position of the swivel axis of the window pane can thus be fixed through the variable slope of the tangents.

This solution has the advantage that the swivel movement of the window pane is not bound to the structural design of the articulated joint but can be fixed freely in space. The contact zones on the segments and the contact areas on the base body and/or holding body can be designed so that the window pane can be swivelled about any selected point in space.

BRIEF DESCRIPTION OF THE DRAWINGS

The invention will now be explained with reference to the embodiments in the drawings in which.

DETAILED DESCRIPTION OF THE INVENTION

Figure 1:
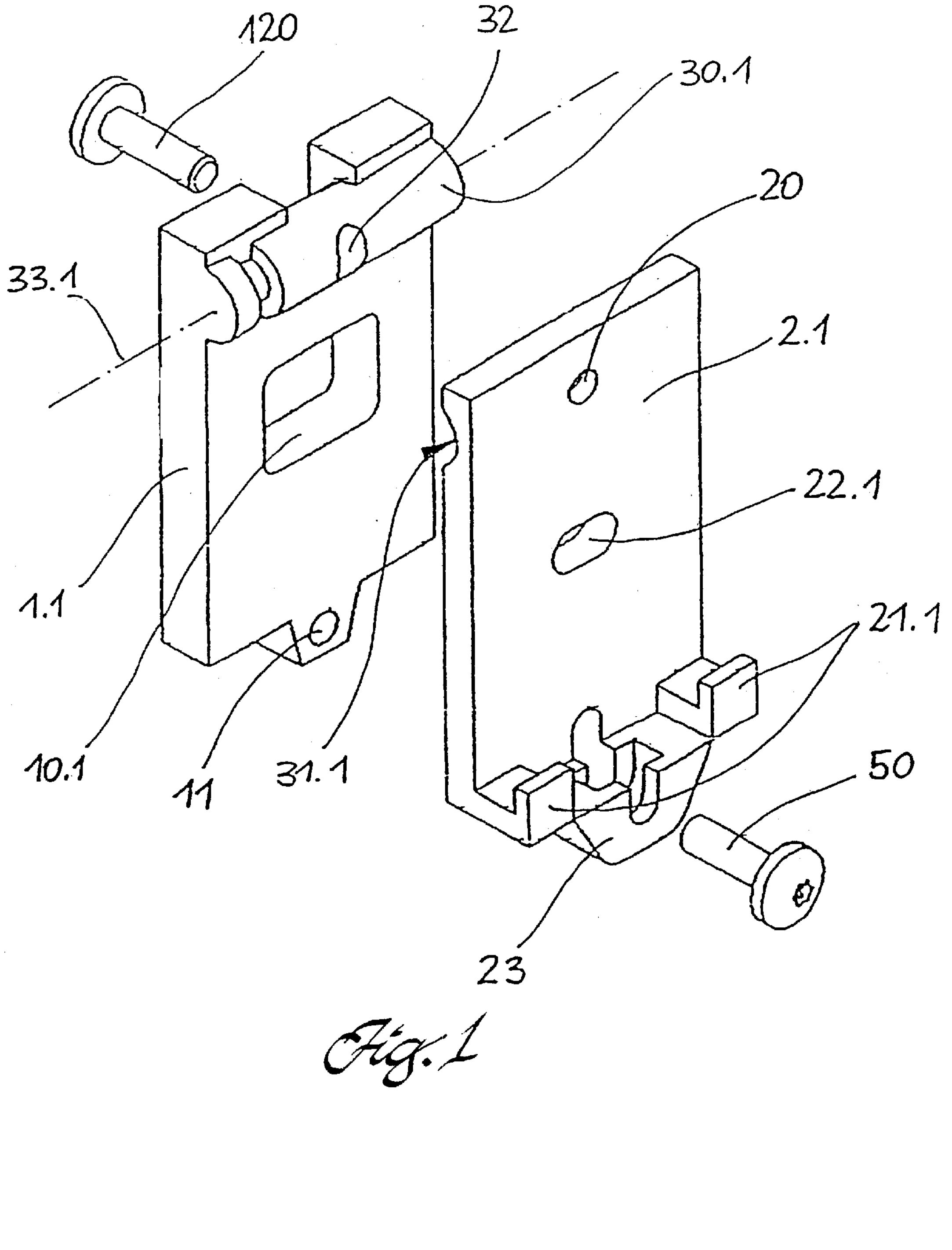
FIG. 1 shows a perspective view of an adjustable carrier with an adjusting screw.

The following co-ordinate system will be used for indicating the directions below:

x-axis: driving direction y-axis: horizontal and transversely to the driving direction z-axis: vertical and transversely to the driving direction FIG. 1 shows the construction of a carrier. A base body 1.1 which is guided on a guide track (not shown here) of a window lift, is connected for articulated movement to a holding body 2.1.

The articulated connection is produced through a cylinder-shaped guide member 30.1 which is associated with the base body 1.1 and which corresponds to a guide surface 31.1 formed on the holding body 2.1

In this area a full length through bore 32 is provided in the guide member 30.1 and a corresponding threaded bore 20 is provided in the holding body 2.1 into which a clamping screw 120 engages.

The holding body 2.1 is associated with a window pane (not shown here). This window pane is supported on window pane holders 21.1 and is connected to the holding body 2.1 through a window pane bolt (not shown here) which is guided through the window pane bolt bore 22.1. A recess 10.1 is provided in the base body 1.1 in order to ensure there is sufficient space for the window pane bolt.

In the lower part of the carrier is an adjusting screw 50, the head of which is embedded in a socket 23 mounted on the holding body 2.1 and engages in a threaded bore 11 of the base body 1.1.

In order to adjust the slope of the window pane the adjusting screw 50 is turned and the distance between the base body 1.1 and holding body 2.1 is changed in defined manner. The guide face 31.1 thereby slides on the guide member 30.1 so that the holding body 2.1 is swivelled in the y-direction relative to the base body 1.1. This movement takes place about a swivel axis 33.1 lying on the x-axis. The swivel axis 33.1 is not fixed but shifts with the movement. The position of the window pane is also displaced slightly on the z-axis.

The clamping screw 120 serves to fix the position of the holding body 2.1 relative to the base body 1 and thus to fix the slope of the window pane.

Figure 2:
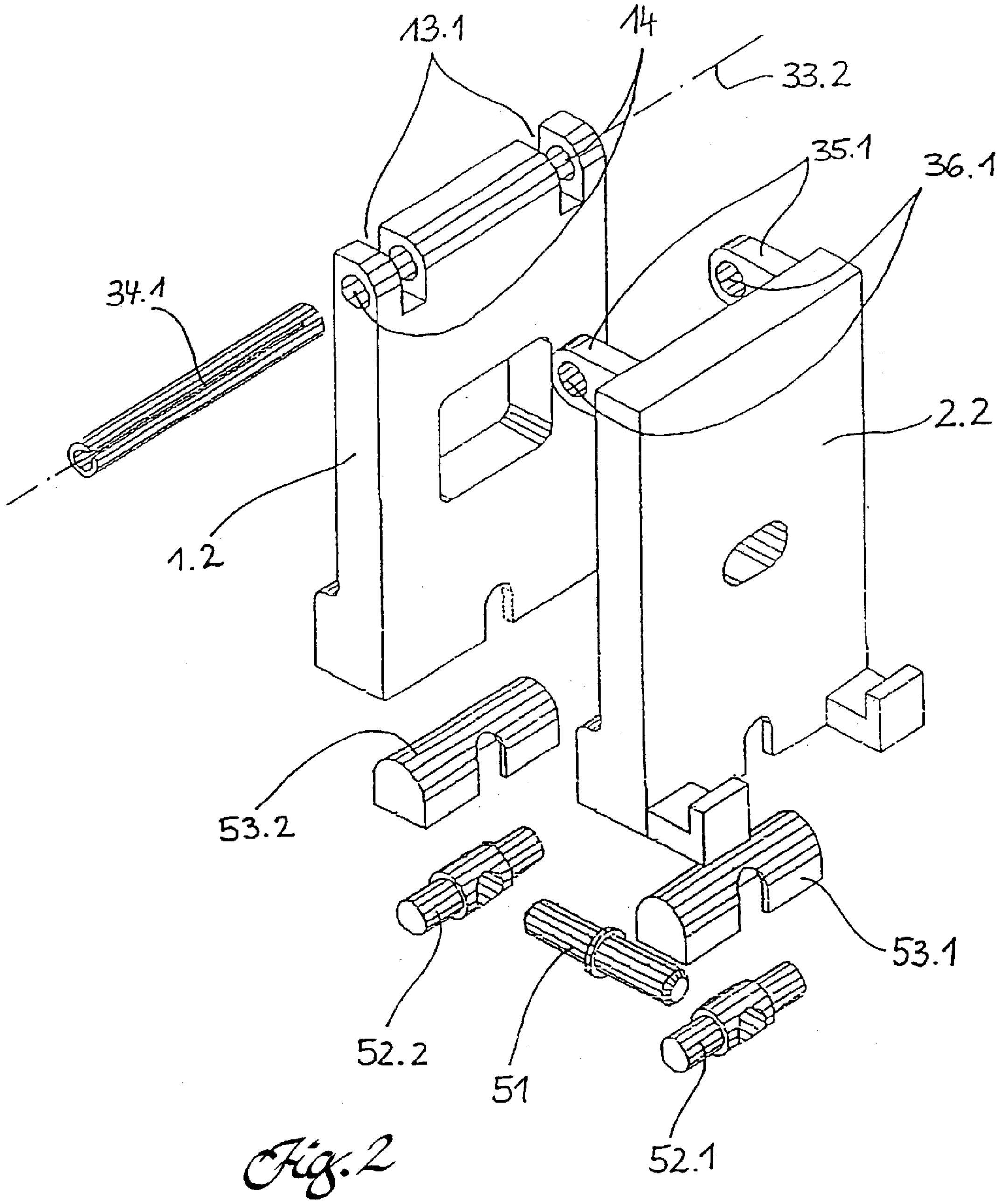
FIG. 2 shows a perspective view of an adjustable carrier with adjusting bolts for displacement.

FIG. 2 describes another design. Here the articulated connection between the base body 1.2 and the holding body 2.2 is produced through an axis. designed as a clamping sleeve 34.1. Bearing tabs 35.1 are formed on the holding body 2.2 and engage in corresponding openings 13.1 in the base body 1.2. Bearing bores 36.1 in the bearing tabs 35.1 hold the clamping sleeve 34.1 which is mounted in the bores 14 of the base body 1.2. Thus the holding body 2.2 can swivel about the swivel axis 33.2 relative to the base body 1.2.

Adjustment is carried out through a threaded bolt 51 which engages on each side in steppe d bolts 52.1; 52.2. The stepped bolt 52.1 is mounted in the base body 1.2 and the stepped bolt 52.2 is mounted in the holding body 2.2, with these positions being fixed by plastics clips 53.1; 53.2.

The slope of the window pane is adjusted by the rotary movement of the threaded bolt 51. One revolution results in a definite change in the setting angle of the holding body 2.2 relative to the base body 1.2.

The position is fixed by a separate screw (not shown here). The window pane is fixed in a similar way to the example explained with reference to FIG. 1.

Figure 3:
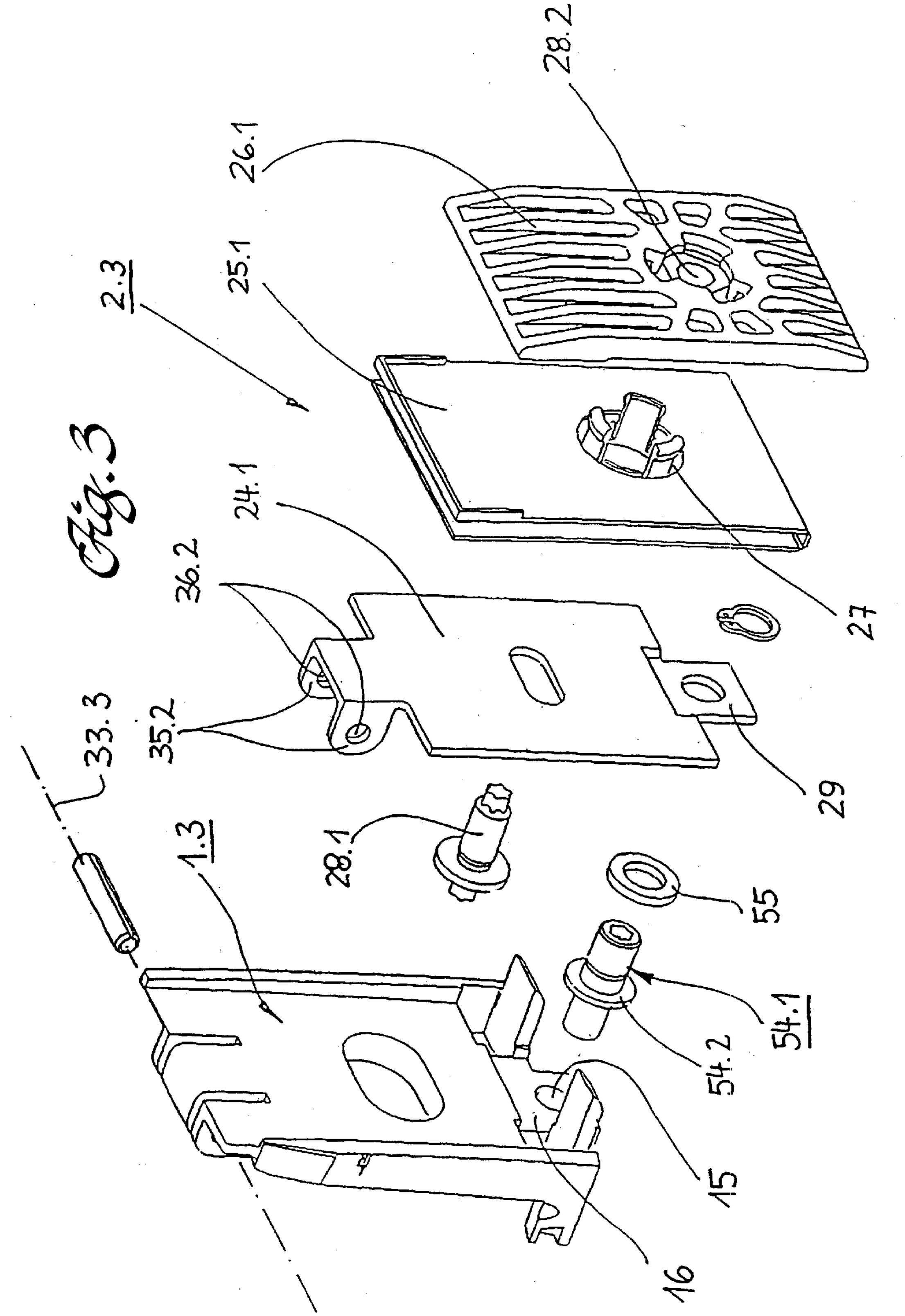
FIG. 3 shows a perspective view of an adjustable carrier with adjusting screw and pane clamp.

FIG. 3 shows a further embodiment of the invention. The holding body 2.3 is here designed in three parts for the purpose of providing a smooth clamp around the window pane, and consists of a socket plate 24.1, an insert 25.1 and a holding plate 26.1. The socket plate 24.1 is connected to the base body 1.3 similar to the embodiment described with reference to FIG. 2. The socket plate 24.1 is adjoined by the insert 25.1 which surrounds the window pane. The socket plate 24.1 supports a collar 27 which engages in a hole in the window pane.

A fixing screw 28.1 provided for clamping the window pane engages through the socket plate 24.1, through the insert 25.1 and through the holding plate 26.1 The fixing screw spreads out the collar 27 and thus fixes the position of the window pane. The articulated connection between the base body 1.3 and the holding body 2.3 is produced similar to the example described with reference to FIG. 2.

A threaded bore 28.2 is formed in the holding plate 26.1 to hold the fixing screw 28.1 which engages into the threaded bore. By turning the fixing screw 28.1 the holding plate 26.1 is drawn against the socket plate 24.1 and thus the window pane becomes clamped.

Adjusting the slope of the window pane is carried out through an adjusting screw 54.1. One side of the adjusting screw 54.1 engages in a threaded bore 15 which is formed on a projection 16 of the base plate 1.3. The adjusting screw 54.1 has a collar 54.2 which bears against a projection 29 of the socket plate 24.1 through a rubber buffer 55 and in the installed position projects into the area of the holding plate 28.2. By turning the adjusting screw 54.1 the collar 54.2 presses against the projection 29 so that the adjustment process can be produced in this way.

Figure 4:
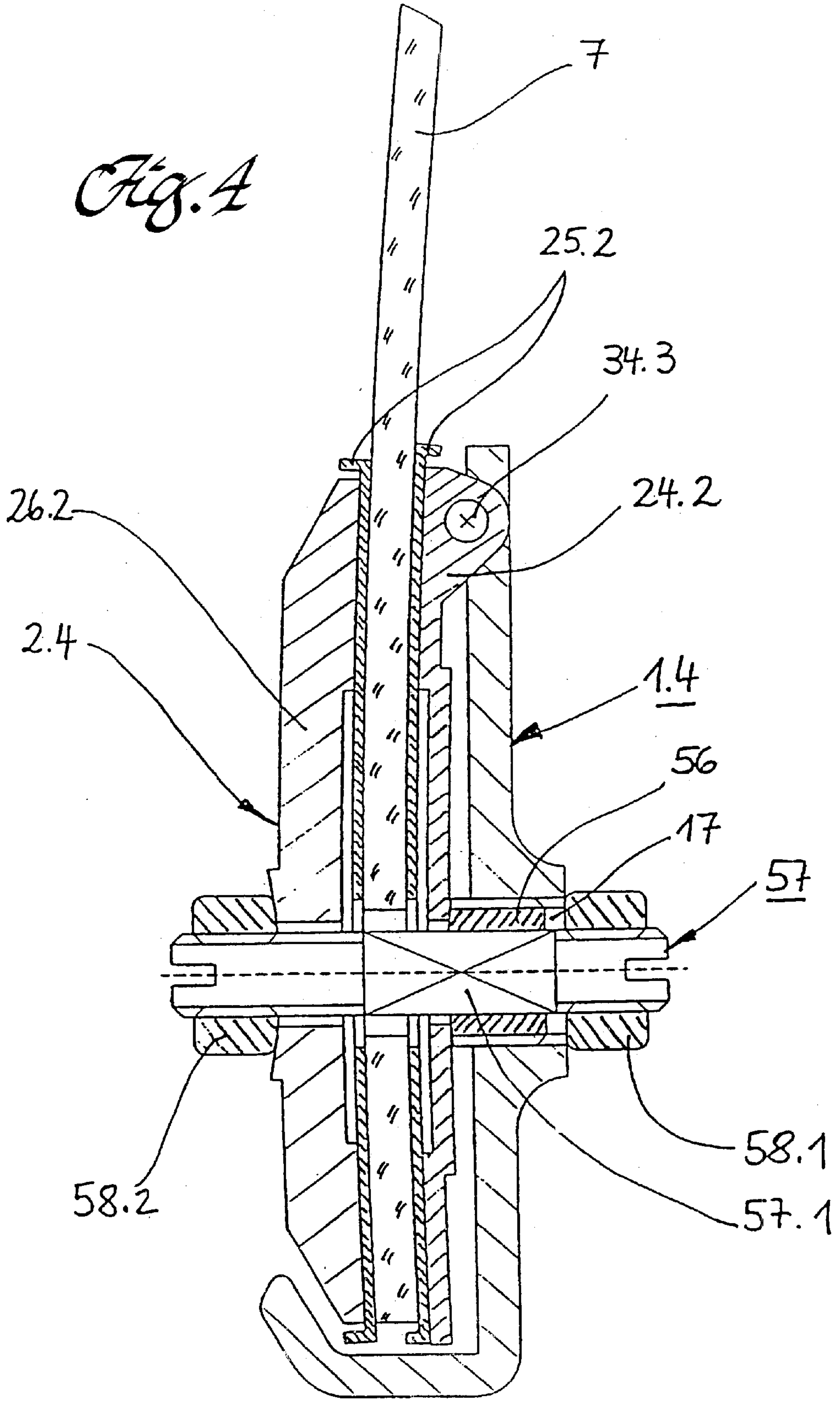
FIG. 4 shows a carrier with a threaded spindle as adjusting element and fixing in the hole of the window pane.

FIG. 4 shows a further design of the invention. The window pane 7 is clamped as in the embodiment according to FIG. 3 through an insert 25.2 between a socket plate 24.2 and a holding plate 26.2. The socket plate 24.2 is connected for articulated movement with the base body 1.4 through a bolt 34.3.

A threaded member 56 is mounted centrally in the base body 1.4 in a threaded bore 17. A threaded spindle 57 runs through the threaded member 56 and through a bore in the holding body 2.4. The ends of the threaded spindle 57 are assigned nuts 58.1, 58.2 wherein the nut 58.2 has a left-hand thread and the nut 58.1 has a right-hand thread. The threaded spindle 57 has in the region of the threaded member 56 a square edge 57.1 which engages in a correspondingly shaped contour of the threaded member 56.

Adjusting the window pane 7 proceeds as follows:

One of the nuts 58.1, 58.2 is loosened. Then the spindle 57 is turned. The opposing nuts 58.1, 58.2 are thereby entrained. The rotary movement of the spindle 57 is determined by the square edge 57.1 on the threaded member 56. This stands in engagement with the base body 1.4 through a thread. As a result of the rotation of the spindle 57, the threaded member 56 is moved on the y-axis relative to the base body 1.4 and is pressed against the holding body 2.4 so that this is swivelled about the bolt 34.3.

After the adjustment process the position is fixed by tensioning the nuts 58.1 or 58.2.

Figure 5:
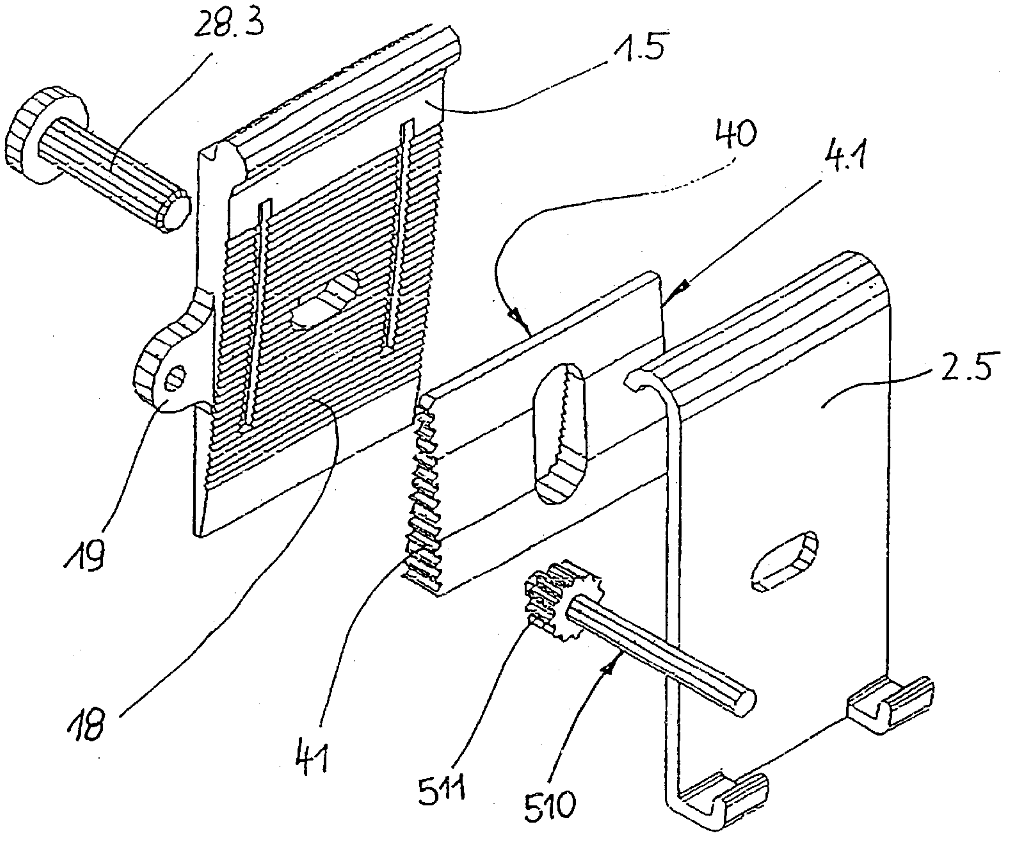
FIG. 5 shows a carrier with a sliding wedge and a pinion engaging laterally on the sliding wedge angles adjusting element.

A further embodiment is shown in FIG. 5. The articulated connection between the holding body 2.5 and the base body 1.5 corresponds substantially to the embodiment as described with reference to FIG. 1.

The displacement of the holding body 2.5 relative to the base 20 body 1.5 is carried out by a displaceable part, which is designed here as a sliding wedge 4.1. The sliding wedge 4.1 is mounted between the holding body 2.5 and the base body 1.5. The contact surface 18 associated with the base body 1.5 and the contact surface 40 associated with the sliding wedge 4.1 have ribs to enable a gripped contact between the base body 1.5 and the sliding wedge 4.1.

Changing the position of the holding body 2.5 relative to the base body 1.5 is carried out by moving the sliding wedge 4.1 on the z-axis.

With the design illustrated in FIG. 5 a spline 41 is attached at the side of the sliding wedge 4.1 into which a pinion 511 engages as a part of an adjusting tool 510. The adjusting tool 510 is mounted in a bore of a tab 19 formed on the base body 1.5.

By turning the adjusting tool 510 the sliding wedge 4.1 can be moved on the z-axis and thus the slope of the holding body 2.5 relative to the base body 1.5 can be changed.

Fixing this position and fixing the window pane are carried out through a fixing screw 28.3 which engages through recesses (visible in FIG. 5 but not numbered) in the base body 1.5, in the sliding wedge 4.1, in the holding body 2.5 and in the window pane (not shown). This fixing screw 28.3 is assigned a nut (likewise not shown) so that the window pane can be clamped in the desired position.

Figure 6:
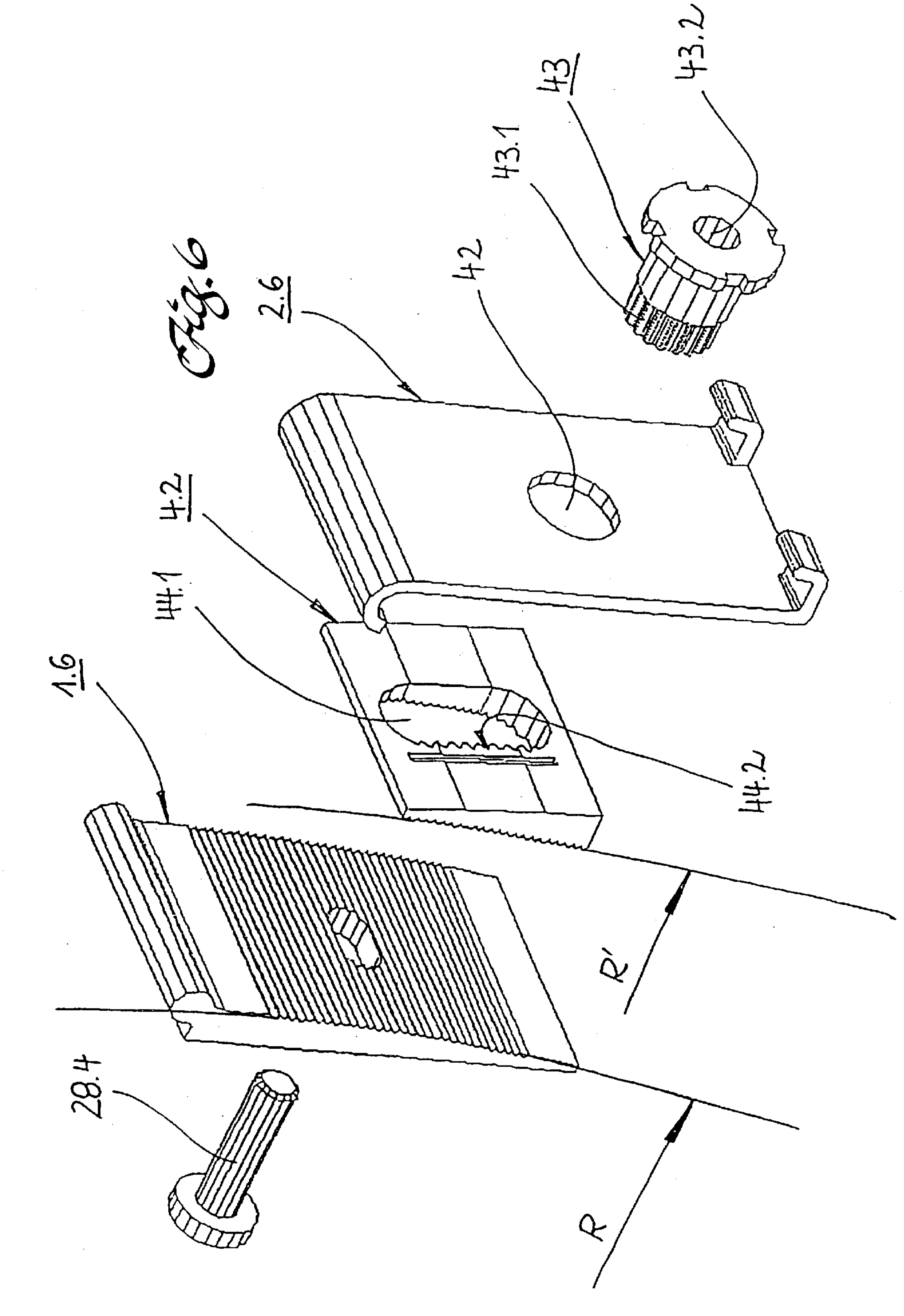
FIG. 6 shows a carrier with a sliding wedge and a pinion engaging in the center.

The example illustrated in FIG. 6 corresponds in its design substantially to the example illustrated in FIG. 5. The displacement of the sliding wedge 4.2 is here achieved through an adjusting bolt 43 mounted centrally in the holding body 2.6 in a bore 42. This adjusting bolt 43 has a spline 43.1 which is connected to an internal spline 44.2 attached on one side in a recess 44.1 of the sliding wedge 4.2. By turning the adjusting bolt 43 it is possible to move the sliding wedge 4.2 in the z-direction and thus to produce the desired position.

A fixing screw 28.4 engages in a threaded bore 43.2 of the adjusting bolt. The window pane can thus be tensioned in the desired position.

In an advantageous design of the contact surfaces between the sliding wedge 4.2 and the base body 1.6, they are formed as circular arc shaped curved surfaces. The radii R, R' of the circular arc shaped curved surfaces are approximately the same size and have a common center point (not shown here). This allows a contact bearing over the entire surface whatever the position of the sliding wedge 4.2 relative to the holding body 2.6.

Figure 7:
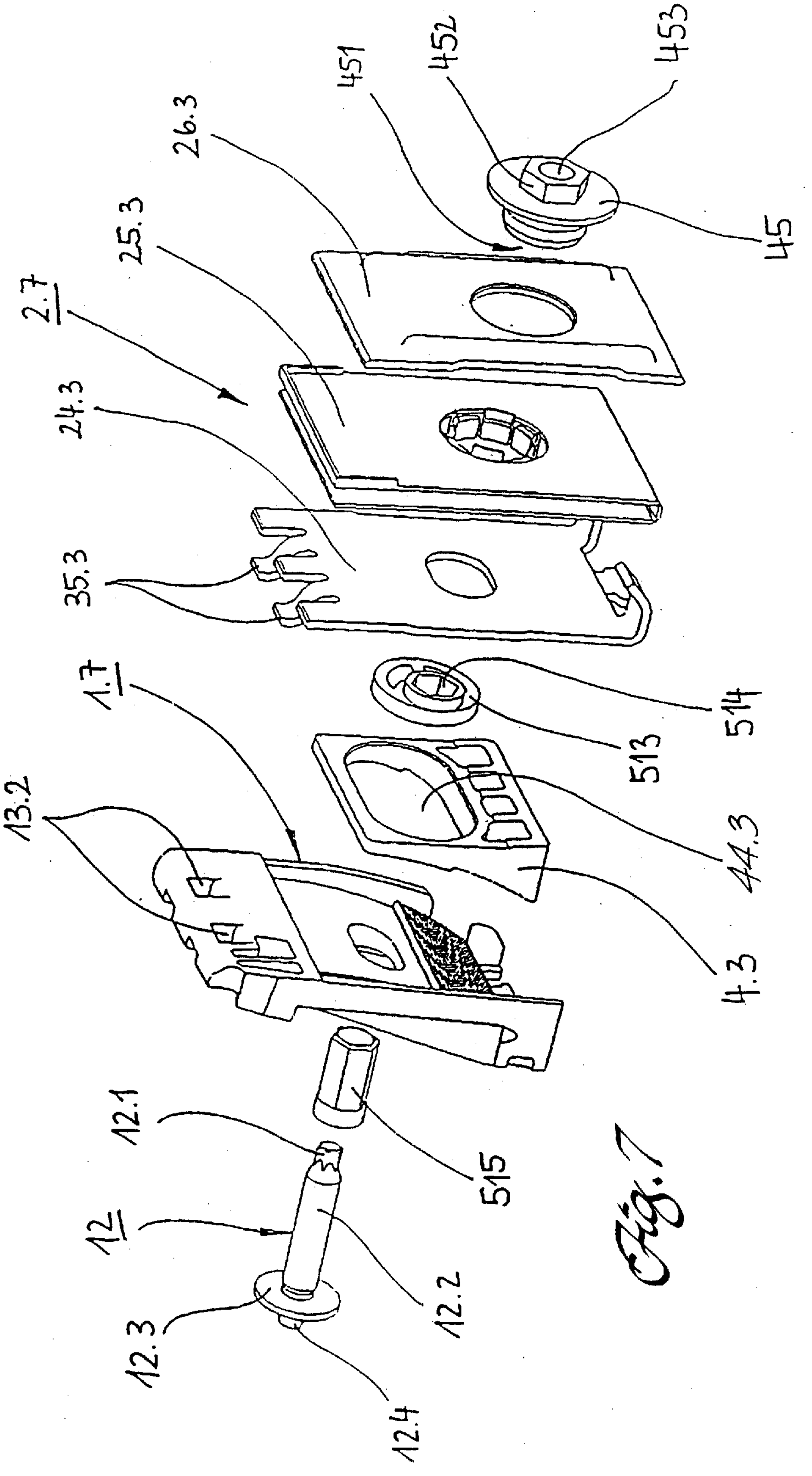
FIG. 7 shows a carrier with a sliding wedge and an eccentric as adjustment element.
Figure 8:
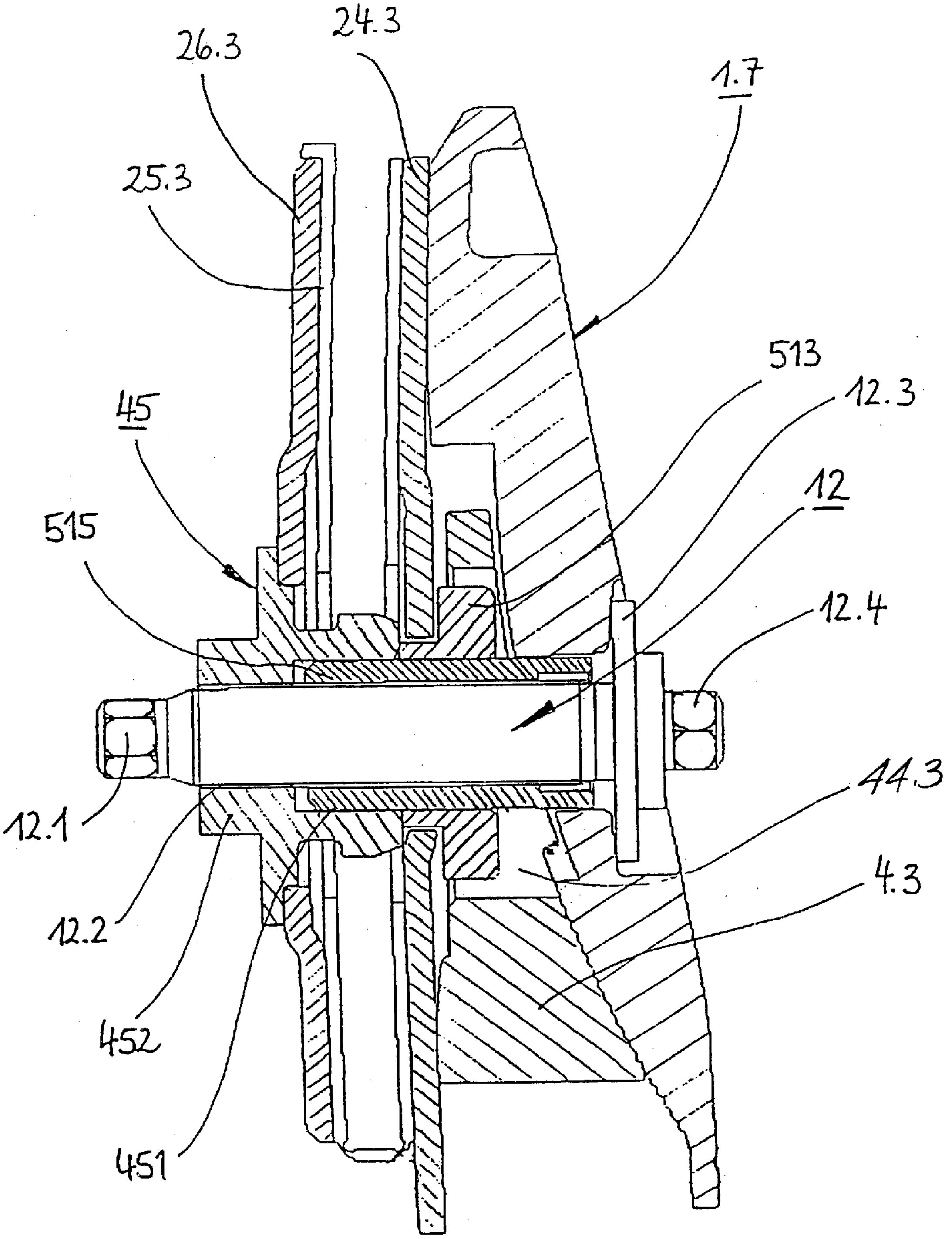
FIG. 8 shows a sectional view of the carrier shown in FIG. 7.

FIGS. 7 and 8 show a solution where the displacement is likewise carried out through a sliding wedge 4.3.

The holding body 2.7 corresponds in its construction substantially to the example described with reference to FIG. 3. The window pane (not shown here) is held in an insert 25.3 and is clamped through the socket plate 24.3 and the holding plate 26.3. The holding body 2.7 is bound to the base body 1.7 through fingers 35.3 which are mounted in the upper part of the socket plate 24.3 and engage in corresponding recesses 13.2 in the base body 1.7.

The sliding wedge 4.3 whose contact surfaces with the base body are formed as in the previous example as circular arc shaped curved surfaces, is mounted between the base body 1.7 and the socket plate 24.3. A recess 44.3 is mounted centrally in the sliding wedge 4.3 and an eccentric 513 is mounted in the recess. The engagement in the eccentric 513 is formed as an internal hexagon 514 in which engages a bush 515 having a hexagonal outer contour.

This bush 515 is mounted with its hexagonal outer contour in positive engagement in an internal hexagon 451 of the adjustment bush 45. This internal hexagon 451 continues as a threaded bore 453 wherein the adjustment bush 45 is provided in this region with an external hexagon 452. A clamping screw 12 with screw head 12.4 is mounted inside the bush 515 and has a collar 12.3 which adjoins the base body 1.7. The other end of the clamping screw is provided with an external engagement 12.1 which is formed for example as a torus or external hexagon. The shaft of the clamping screw 12 supports a thread 12.2 which engages with the thread 453 of the adjustment bush 45.

In order to change the slope of the holding body 2.7 and thus the slope of the window it is necessary to proceed as follows:

The external hexagon 452 of the adjustment bush 45 is seized and turned by a suitable tool. The rotary movement is transferred through the internal hexagon 451 of the adjustment bush 45 to the bush 515 and thus to the eccentric 513. This moves the sliding wedge 4.3 on the z-axis so that the position of the holding body 2.7 relative to the base body 1.7 is changed.

If this ideal position is reached then this position is fixed by seizing the clamping screw 12 round its external engagement 12.1 with a suitable tool and tensioning it relative to the adjustment bush 45. The external hexagon 452 of the adjustment bush 45 is thereby held.

Figure 17:
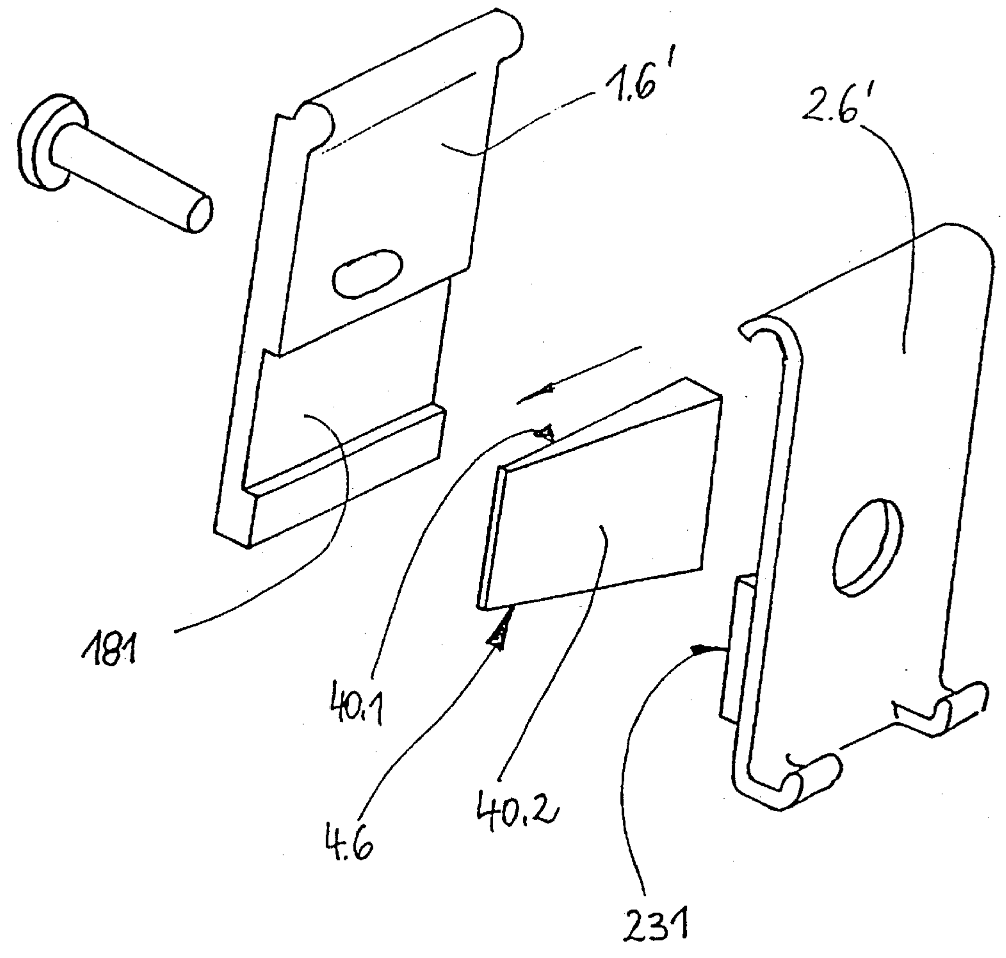
FIG. 17 shows a perspective view of a carrier with a sliding wedge displaceable in the x-direction.

In FIG. 17 a solution is shown wherein a sliding wedge 4.6 is mounted between the base body 1.6' and the holding body 2.6'. This sliding wedge is arranged so that its taper points in the x-direction.

As the sliding wedge 4.6 moves in the x-direction (direction of arrow), the contact surfaces 40.1; 40.2 of the sliding wedge slide on the associated contact surfaces 181 on the base body 1.6' or on the contact surface 231 on the holding body 2.6'.

This results in the holding body 2.6' swivelling relative to the base body 1.6' about the articulated connection which can be seen in FIG. 17 but is not marked in any further detail.

In order to ensure the contact surfaces 181, 231 bear against each other over their entire surface area they are provided with a restriction which is not shown in the drawings.

The movement of the sliding wedge 4.6 is carried out by adjusting means as already described in the above examples.

Figure 9:
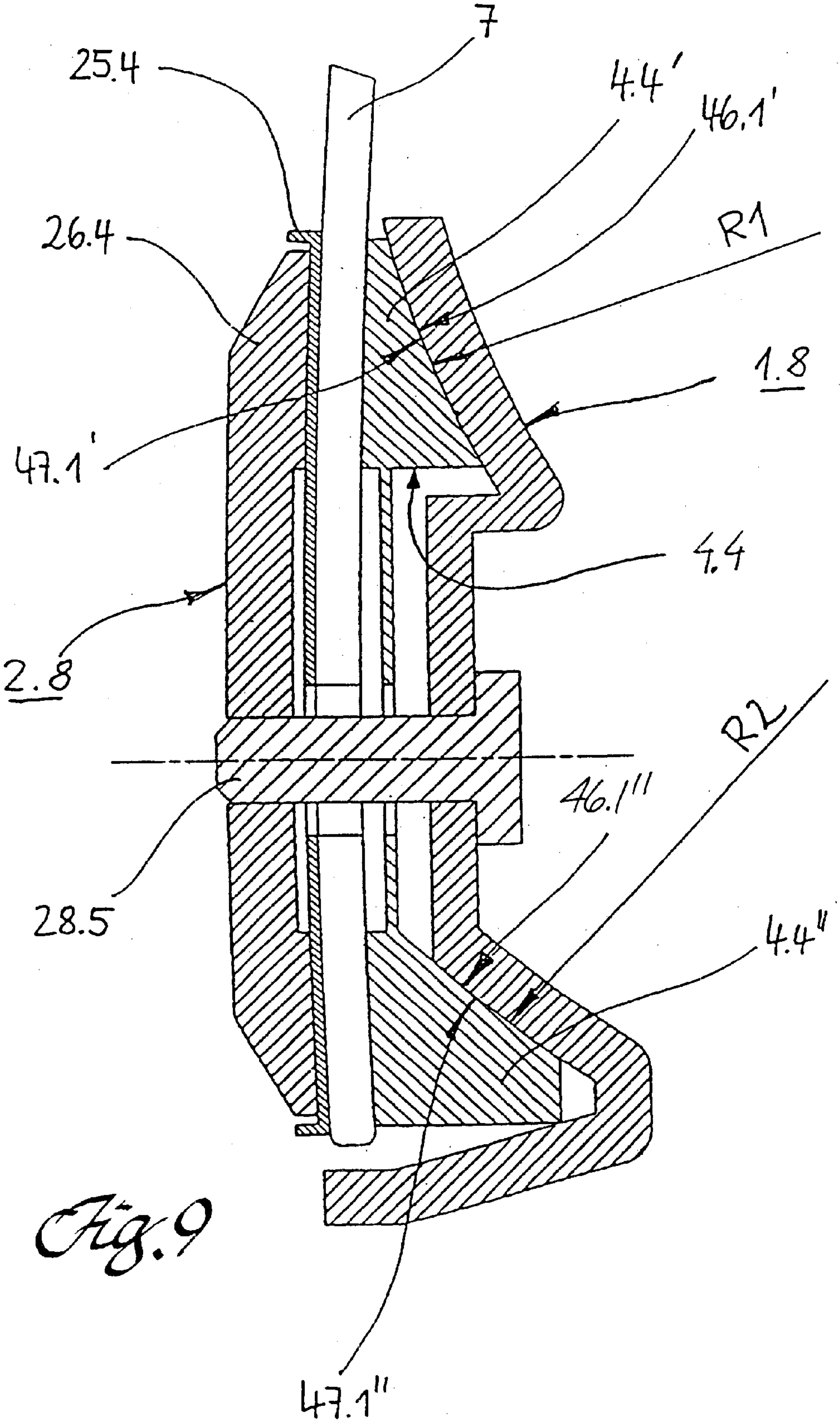
FIG. 9 shows a carrier with a double sliding wedge.
Figure 10:
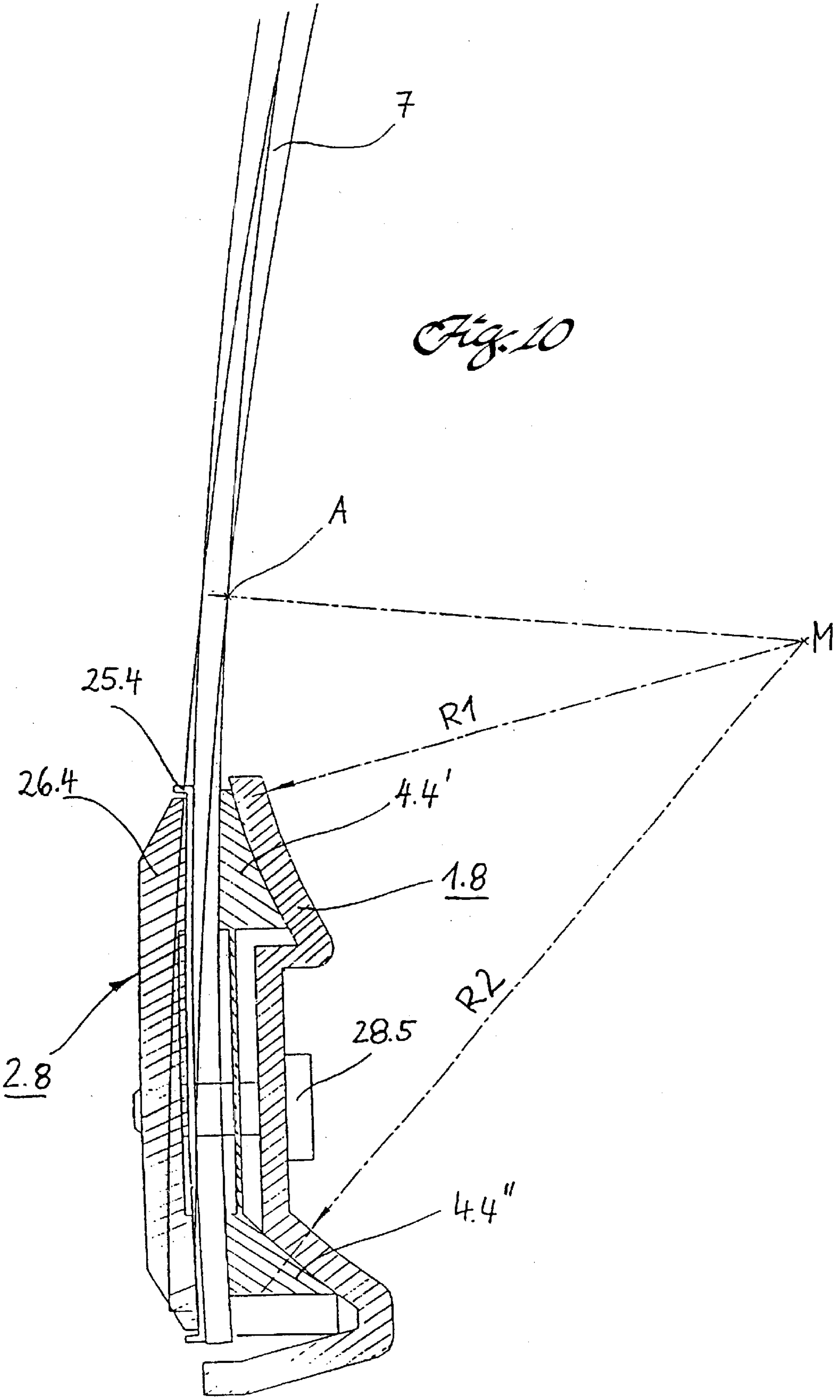
FIG. 10 shows a diagrammatic view of the position of the momentary pole with a double sliding wedge.

A further variation of the solution is described in FIG. 9 in connection with FIG. 10. Here the window pane 7 is held between a holding plate 26.4 and a displaceable part 4.4 wherein an insert 25.4 is provided between the holding plate 26.4 and the window pane 7. This unit is tensioned with the base body 1.8. The tensioning is produced through a fixing screw 28.5 which is screwed into the holding plate 26.4 and which runs through corresponding recesses (not shown in further detail in the drawings) to fix the window pane 7.

The displaceable part 4.4 consists of two segments 4.4', 4.4" which are fixedly connected together. The segments 4.4', 4.4" have contact zones 46.1'; 46.1" which are in connection with contact areas 47.1', 47.1" of the base body 1.8.

In order to ensure the contact zones 46.1', 46.1" bear with their entire surface area against the contact regions 47.1', 47.1" during displacement, here both the contact zones 46.1', 46.1" and the contact regions 47.1', 47.1" associated with same are designed as circular arc shaped curved surface areas. The radius Rl of the upper segment 4.4' is larger than the radius R2 of the lower segment 4.4" Both have a common center point M (see FIG. 10).

In order to change the position of the window pane 7 the displaceable part 4.4 is moved on the z-axis. The socket body 2.8 thereby moves with the window pane 7 about the center point M.

The center point M does not move during the adjustment process. The spot A marked in FIG. 10 is the spot where the perpendicular from the center point M to the surface of the window pane 7 includes a right angle with the tangent at this place. This spot A has as a result of displacement also a component of movement upwards (z-direction). Since the window pane is however only fixed after the adjustment process this can be corrected. Thus the window pane body swivels as shown in FIG. 10 noticeably about the point A during adjustment.

Through these geometrical features it is possible with suitable dimensions of the radii RI, R2 to place at the spot A at any desired place.

The invention is however not restricted to the embodiment of the contact zones 46.1', 46.1" and the contact regions 47.1', 47.1" as circular arc shaped curved surfaces with the aforesaid design of radii. It is also possible to design these as any type of curved or any type of flat surfaces. However a contact bearing over the entire surface area is then not reached. The contact zones and/or contact regions shaped in this way have a linear contact, with this line wandering as the segments are displaced.

Figure 11:
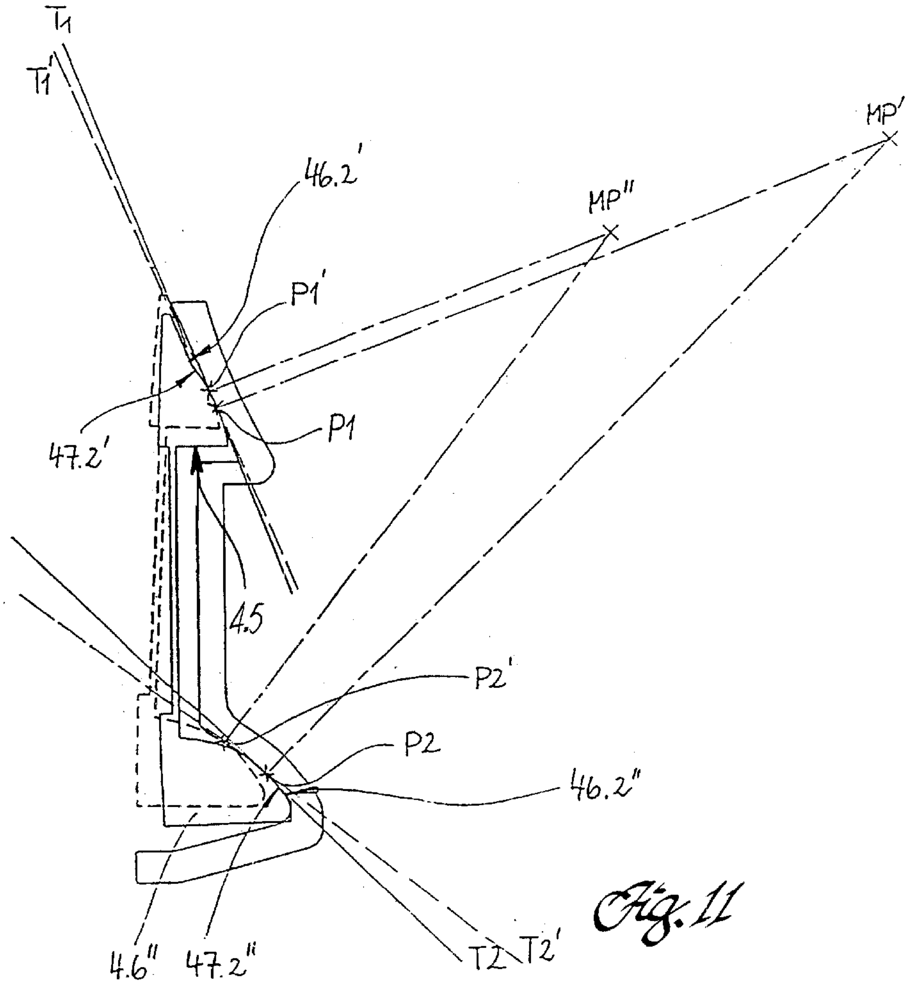
FIG. 11 shows a diagrammatic view of a sliding wedge with non circular arc shaped contact zones and contact faces.
Figure 12:
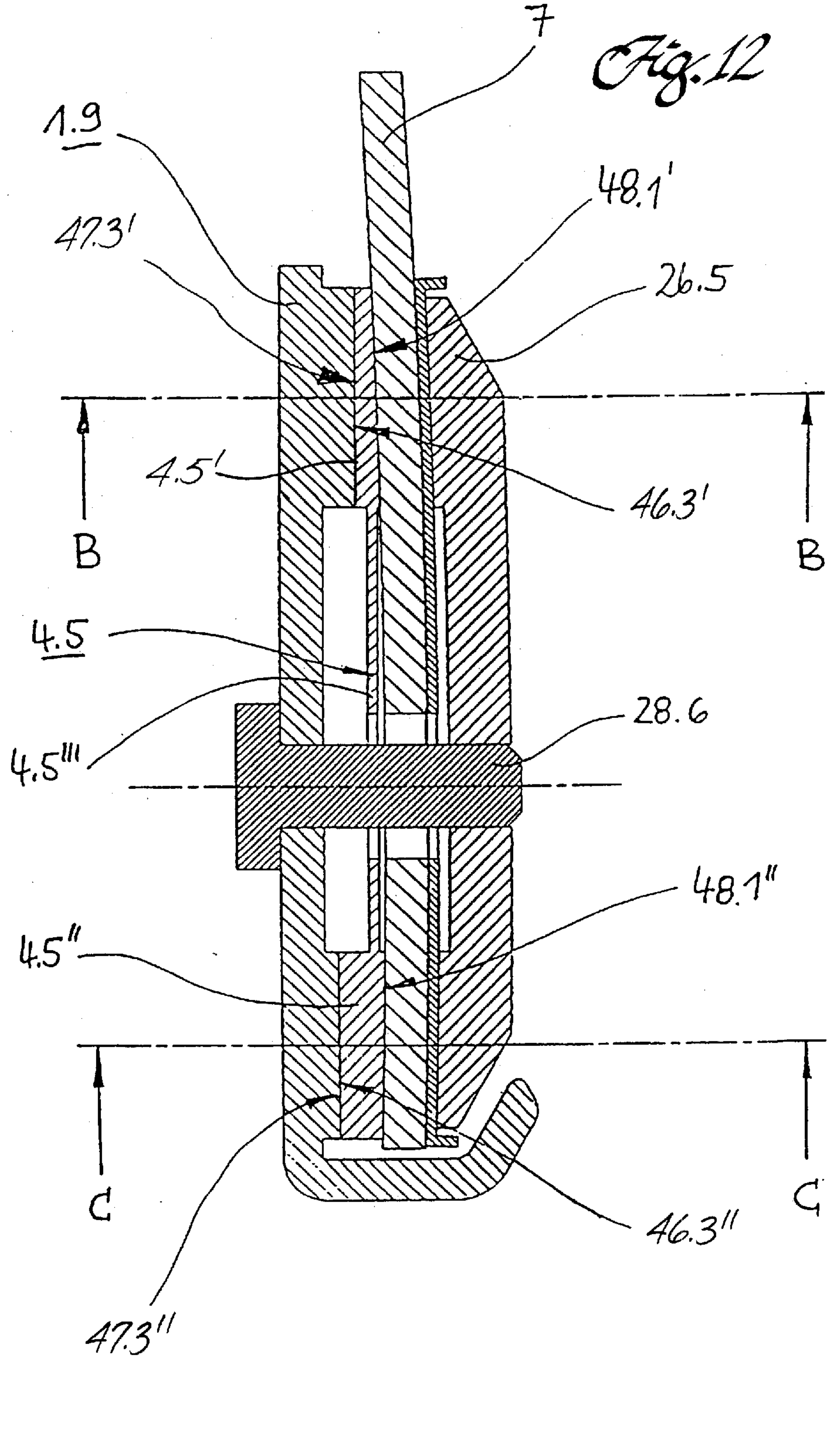
FIG. 12 shows a view of a carrier with two sliding wedges displaceable relative to each other on the x-axis.
Figure 13:
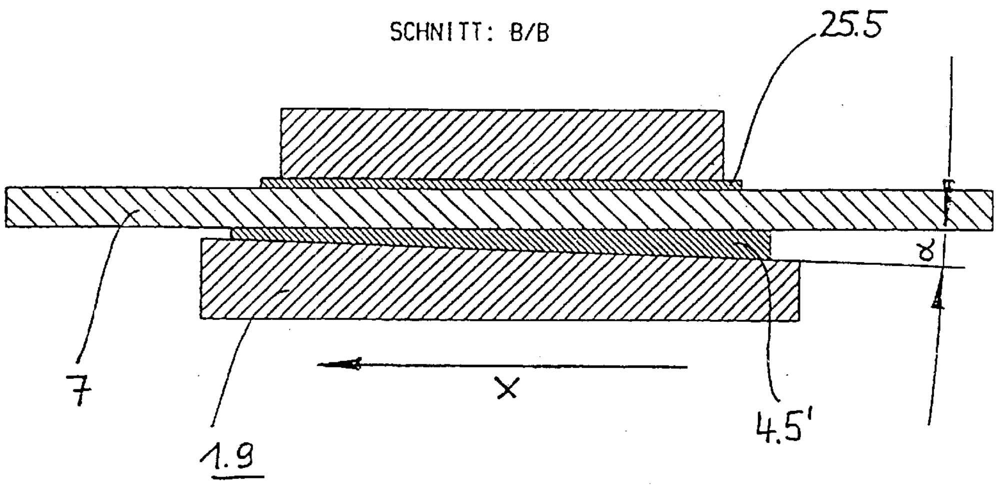
FIG. 13 shows a sectional view along B/B of FIG. 12.
Figure 14:
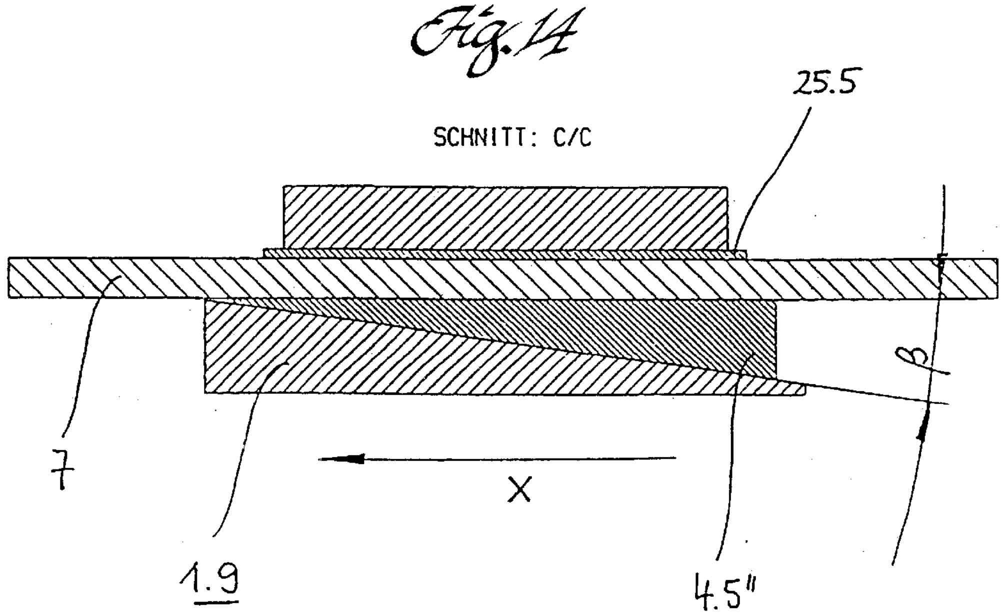
FIG. 14 shows a sectional view along C/C of FIG. 13.
Figure 15:
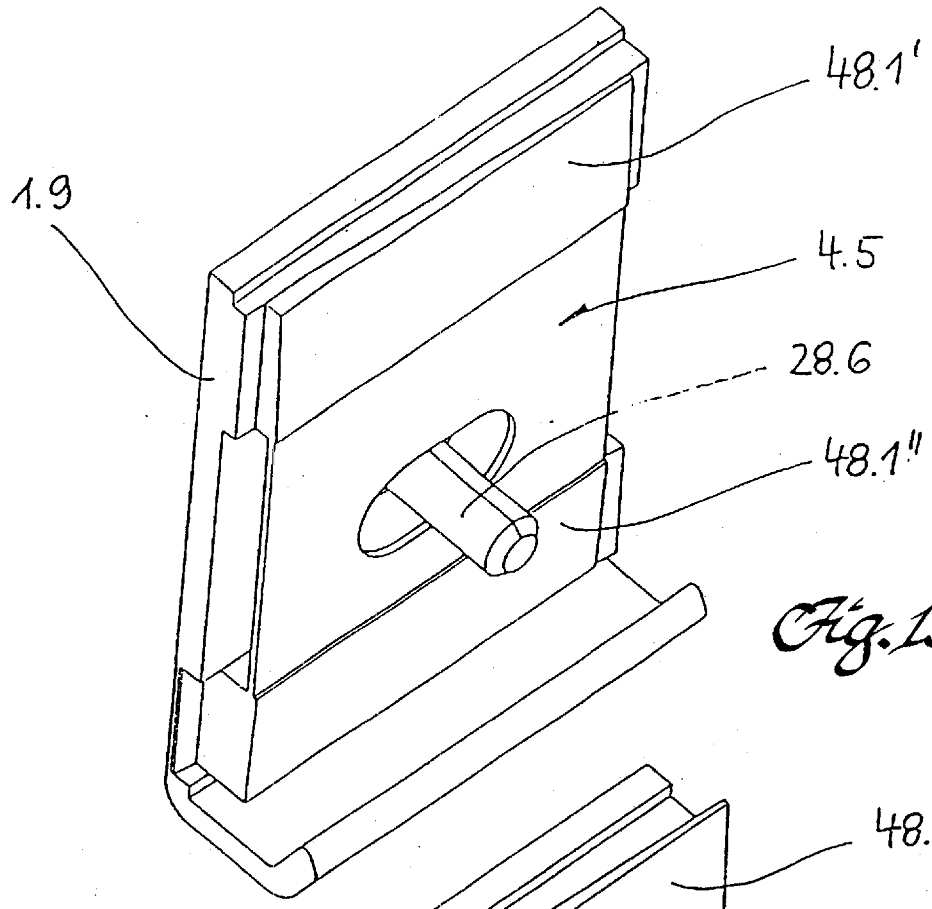
FIG. 15 shows a perspective view of the carrier illustrated in FIG. 12.
Figure 16:
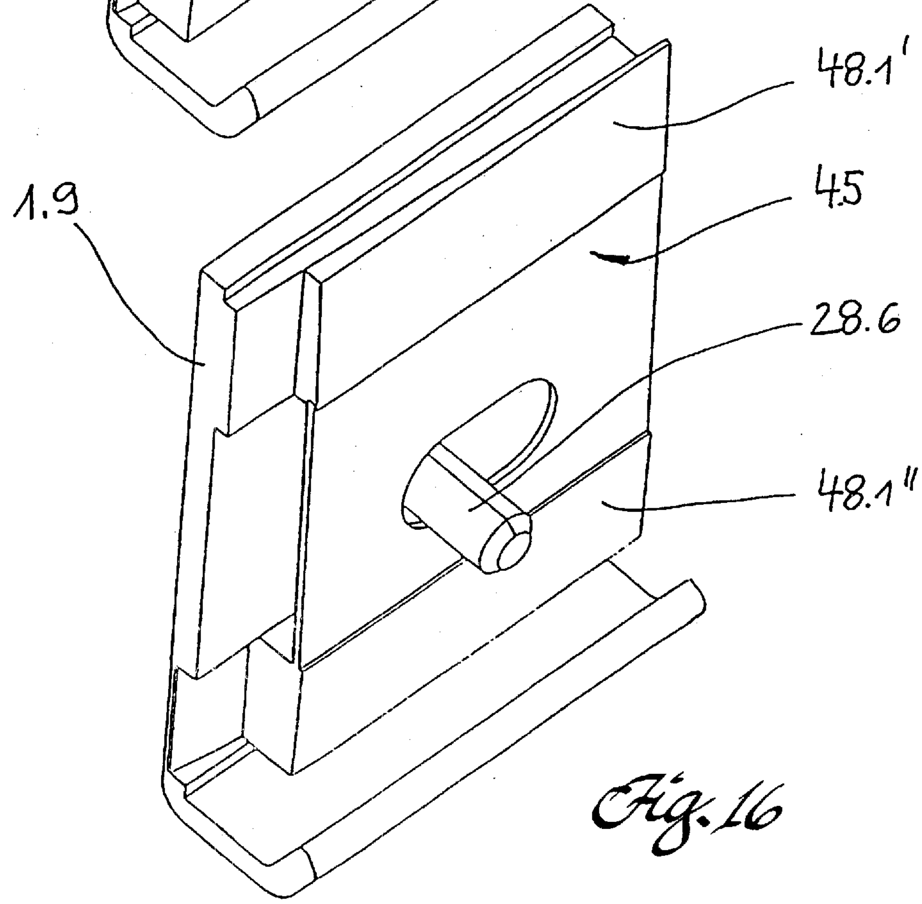
FIG. 16 shows a perspective view of the carrier illustrated in FIG. 12 in a moved position.

A solution of this kind is shown diagrammatically in FIG. 11. The contact zones 46.2', 46.2" in the position shown in solid lines contact the contact regions 47.2', 47.2" at points P1, P2. The slopes of the tangents T1, T2 at this point are different. The condition has to be fulfilled where the tangent T2 with regard to the x-direction has a lesser slope than the tangent T1. The orthogonal of the tangents T1, T2 meet at the momentary pole MP'

When the displacement part 4.5 moves on the z-axis, the points P1, P2 move about the momentary pole MP'. A further position of the displaceable part 4.5 is drawn in by dashed lines. It can be seen that the slope of the tangents T1', T2' alters in the new contact point P1', P2'. A new momentary pole HP" is thereby produced. It is clear that the momentary pole MP" has thereby moved relative to the momentary pole MP'. Thus the designer has the possibility of fixing the movement of the momentary pole MP', MP" and thus the displacement path of the window pane 7 by configuring the path of the contact zones 46.2', 46.2" and the contact regions 47.2', 47.2". The shift in the window pane 7 in the z-direction which thereby occurs can be compensated prior to its final fixing in the ideal position.

The path of movement of the momentary pole shown in FIG. 11 represents the general case. As a special case the example applies as shown in FIGS. 9 and 10 since the momentary pole MP does not move through the configuration illustrated there of the radii R1 and R2.

The displacement of the segments can take place by means such as those already described above. These include for example displacement by an adjustment pinion which engages in a spline provided at the side on the displaceable part (see FIG. 5). These means are not shown in FIGS. 9 to 11.

A further embodiment of the invention is illustrated in FIGS. 12 to 16. Also here the window pane 7 is held between a holding plate 26.5 and a displaceable part 4.5. An insert 25.5 is provided between the holding plate 26.5 and the window pane 7. This unit (holding plate 26.5, insert 25.5) is tensioned with the base body 1.9. The tensioning is produced through a fixing screw 28.6 which runs through corresponding recesses (not shown in further detail in the figures) and is screwed to the holding plate 26.5. The window pane is thereby fixed in the ideal position.

The displaceable part 4.5 consists of two segments 4.5'and 4.5" which are connected together through a flexible web 4.5'". The segments 4.5' and 4.5" are designed as wedges lying on the x-axis and having different wedge angles α, β. The position of the segments with the wedge angles α, β can be seen from the sectional diagrams shown in FIGS. 13 and 14. The tapers of the wedges each point in the same direction. The segments 4.5' and 4.5" bear with their contact bearing faces 48.1', 48.1' against the window pane 7. On the opposite side, the segments 4.5', 4.5" are provided with contact surfaces 47.3', 47.3" which adjoin contact zones 46.3', 46.3" of the base body 1.9.

The contact surfaces 47.3', 47.3" and the contact zones 46.3', 46.3" are here designed flat. It is however also possible in a similar way to the preceding example to provide between them a linear or spot contact whose tangents at the contact point between the contact face 47.3', 47.3" and the contact zone 46.3 ', 46.3" point in the x-direction and have different slopes.

The method of operation of the carrier described above will be explained with reference to FIGS. 15 and 16. The displaceable part 4.5 is here shown in two different positions. With this illustration to show more clearly the geometric conditions the holding plate 26.5 including window pane 7 have not been drawn in.

A displacement on the x-axis results through the different wedge angle α, β, in a differing shift of the contact bearing faces 48.1', 48.1" in the y-direction, whereby the flexible web 4.5" becomes deformed. Thus the window pane (not shown here) is turned about an axis lying on the x-axis so that a change in the position of the window pane and an exact contact bearing against the vehicle body can be achieved.

In order to obtain a bearing of the contact bearing faces 48.1', 48.1" against the window pane over their entire surface area, the contact faces 47.3', 47.3" and/or contact zones 46.3', 45.3" are provided with a restriction which is not shown in the figures.

The displaceable part 4.4, 4.5, 4.6 is reinforced by adjusting means as already described in the above examples.

In a further design of the invention it is proposed to connect the two segments together neither rigidly nor flexibly but to arrange them individually. The segments can then be displaced independently of each other through adjusting means whereby deliberately preset movement sequences can be produced.

Through this arrangement it is also possible to displace both segments in synchronization.

What is claimed is:

1. An adjustable carrier for connecting a window pane to a window lift of a motor vehicle through at least one guide track, comprising:

a base body to be guided on the guide track;

a holding body for holding the window pane, the holding body being connected to the base body for swivel movement through an articulated joint;

a fastener to fasten the window pane to the holding body, the fastener having a loosened position to loosen the window pane and a fixed position to fix the window pane;

an adjusting device for changing the position of the holding body relative to the base body, the adjusting device acting independently of the fastener so that when the fastener is in the loosened position, the position of the holding body relative to the base body remains unchanged;

a displaceable element associated with the adjusting device for the indirect displacement of the holding body relative to the base body, the displaceable element having a circular arc shaped curved contact surface which corresponds to a contact surface on one of the holding body and the base body for producing a whole surface bearing contact against the said one of the holding body and the base body.

2. An adjustable carrier according to claim 1, wherein the displaceable element is moved in a z-direction by the adjusting device for the indirect displacement of the holding body relative to the base body.

3. The adjustable carrier according to claim 1 or claim 2, wherein the displaceable element has a spline for producing a translatory installing movement which is in engagement with an operating device through a pinion.

4. The adjustable carrier according to claim 1, wherein a pinion is mounted eccentrically on the displaceable element.

5. The adjustable carrier according to claim 1, wherein a spline of an adjusting sleeve engages in an internal spline of a recess mounted in the displaceable element.

6. The adjustable carrier according to claim 1, further comprising:

an eccentric which can be brought into engagement with the displaceable element.

7. The adjustable carrier according to claim 1, wherein the fastener is changed from the loosened position to the fixed position to fix the window pane on the holding body independent of the adjusting device.

8. The adjustable carrier according to claim 1, wherein the windowpane is fastened on the holding body by the adjusting device.

9. The adjustable carrier according to claim 1, wherein the position of the holding body relative to the base body is fixed in the articulated joint connection between the two.

10. The adjustable carrier according to claim 1, wherein the position of the holding body relative to the base body is fixed through the adjusting device.

11. The adjustable carrier according to claim 1, wherein a sliding wedge tapering in the longitudinal direction of the motor vehicle is mounted between the holding body and the base body and can be displaced in the longitudinal direction of the motor vehicle.

12. An adjustable carrier for connecting a window pane to a window lift of a motor vehicle through at least one guide track, comprising:

a base body that can be guided on the guide track;

a holding body for holding the window pane;

a movable displacement device arranged between the holding body and base body for adjusting the angular position between the holding body and base body, the moveable displacement device having two segments of which each segment has a contact zone which is in connection with an associated contact region on one of the base body and the holding body, each connection forming one of contact faces, contact lines and contact points;

a fastener to fix the position of the movable displacement device;

wherein the tangents formed at said one of contact faces, contact lines and contact points have slopes which differ from each other.

13. The adjustable carrier according to claim 12, wherein a position of a swivel axis of the window pane can be fixed through the position of the tangents relative to each other, their slopes and through the ratio of the slopes to each other.

14. The adjustable carrier according to claim 12 or claim 13, wherein the segments are rigidly connected together.

15. The adjustable carrier according to claim 12, wherein the two segments are arranged one above the other along the vertical axis of the motor vehicle.

16. The adjustable carrier according to claim 12, wherein the two segments are not connected together and can be displaced independently of each other or in synchronization with each other through an adjusting device.

17. The adjustable carrier according to claim 12, wherein there is a flat surface contact between at least one of the group consisting of the associated contact regions on the base body and the contact zones of the segments and between the window pane and the segments.

18. The adjustable carrier according to claim 17, wherein the contact zones of the segments have circular arc shaped curved surfaces and correspond with the associated contact regions on the base body and wherein the radius of one segment and the radius of the other segment have a common center point.

19. The adjustable carrier according to claim 12, wherein the connection between the contact zones and the associated contact regions is formed as a contact line.

20. The adjustable carrier according to claim 12, wherein the contact regions and the contact zones of the segments are formed as curved surfaces.

21. The adjustable carrier according to claim 12, wherein the segments are wedges with flat contact zones.

22. The adjustable carrier according to claim 12, wherein the tangents formed at the contact points between the associated contact regions and contact zones lie substantially in a plane which extends at right angles to a longitudinal axis of the vehicle.

23. The adjustable carrier according to claim 22, wherein the moveable displacement device has a displaceable part which is displaceable substantially in a direction of the longitudinal axis of the motor vehicle.

24. The adjustable carrier according to claim 22 or claim 23, wherein the displaceable part has two segments each of which are wedges lying on the longitudinal axis of the motor vehicle and which have different wedge angles.

25. The adjustable carrier according to claim 22 or claim 23, wherein the segments are connected through a flexible web.

26. The adjustable carrier according to claim 12, wherein the moveable displacement device includes a displaceable part, further comprising an adjusting device for the displacement of the displaceable part, the adjusting device having one of adjusting screws, threaded bolts and threaded spindles.

27. The adjustable carrier according to claim 26, wherein the adjusting device has a spline for producing a translatory installing movement which is in engagement with an operating device through a pinion.

28. The adjustable carrier according to claim 12, wherein the contact regions corresponding to the contact zones are flat.

* * * * *